(12) United States Patent
Iwasaki et al.

(10) Patent No.: US 10,127,893 B2
(45) Date of Patent: Nov. 13, 2018

(54) ELECTRONIC DEVICE, CODE DISPLAY METHOD OF ELECTRONIC DEVICE AND RECORDING MEDIUM

(71) Applicant: CASIO COMPUTER CO., LTD., Shibuya-ku, Tokyo (JP)

(72) Inventors: Shoichi Iwasaki, Fussa (JP); Fumio Goto, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/673,755

(22) Filed: Aug. 10, 2017

(65) Prior Publication Data
US 2017/0337899 A1 Nov. 23, 2017

Related U.S. Application Data

(62) Division of application No. 14/852,423, filed on Sep. 11, 2015, now Pat. No. 9,767,765.

(30) Foreign Application Priority Data

Sep. 18, 2014 (JP) .................................. 2014-190028
Sep. 18, 2014 (JP) .................................. 2014-190170

(51) Int. Cl.
G09G 5/10 (2006.01)
G06F 15/02 (2006.01)
G06F 3/147 (2006.01)
G06K 19/06 (2006.01)

(52) U.S. Cl.
CPC .............. G09G 5/10 (2013.01); G06F 3/147 (2013.01); G06F 15/02 (2013.01);
(Continued)

(58) Field of Classification Search
None
See application file for complete search history.

(56) References Cited

U.S. PATENT DOCUMENTS

2003/0057284 A1* 3/2003 Challa .................. G06K 7/1095
235/462.46
2013/0234850 A1 9/2013 Lee et al.

FOREIGN PATENT DOCUMENTS

JP 04060591 A 2/1991
JP 05053540 A 3/1993
(Continued)

OTHER PUBLICATIONS

Electronics Project Design, "LCD Display," http://www.electronics-project-design.com/LCD_Display.html, Nov. 1, 2006.
(Continued)

Primary Examiner — Nicholas R Wilson
(74) Attorney, Agent, or Firm — Holtz, Holtz & Volek PC

(57) ABSTRACT

An electronic device including a display, a memory that stores instructions, and a processor. The processor, under control of the instructions, performs processes including a first display process of controlling the display such that the display displays a code while setting the display with a contrast ratio; and in a case where the code is displayed on the display, a contrast change process of automatically changing the contrast ratio of the display at each of intervals, each of the intervals corresponding to a first duration of time.

12 Claims, 13 Drawing Sheets

(52) U.S. Cl.
CPC .... *G06F 15/0225* (2013.01); *G06K 19/06112* (2013.01); *G06K 19/06037* (2013.01); *G09G 2320/066* (2013.01); *G09G 2380/04* (2013.01)

(56) References Cited

FOREIGN PATENT DOCUMENTS

| | | |
|---|---|---|
| JP | 07168541 A | 7/1995 |
| JP | 08029756 A | 2/1996 |
| JP | 2003216915 A | 7/2003 |
| JP | 2007156215 A | 6/2007 |
| JP | 2008036183 A | 2/2008 |
| JP | 2008287198 A | 11/2008 |
| JP | 2011076540 A | 4/2011 |
| JP | 2013015450 A | 1/2013 |

OTHER PUBLICATIONS

Japanese Office Action (and English translation thereof) dated Aug. 9, 2016, issued in counterpart Japanese Application No. 2014-190028.

Japanese Office Action (and English translation thereof) dated Jul. 4, 2017, issued in counterpart Japanese Application No. 2014-190170.

Japanese Office Action (and English translation thereof) dated Oct. 4, 2016, issued in counterpart Japanese Application No. 2014-190170.

Panasonic, "Installer's Manual Hospitality LCD HDTV," 2012.

Japanese Office Action (and English language translation thereof) dated Aug. 21, 2018 issued in counterpart Japanese Application No. 2017-185095.

* cited by examiner

ELECTRONIC DEVICE, CODE DISPLAY METHOD OF ELECTRONIC DEVICE AND RECORDING MEDIUM

CROSS-REFERENCE TO RELATED APPLICATIONS

This application is a Divisional application of U.S. Ser. No. 14/852,423, filed Sep. 11, 2015, which claims priority based on Japanese Patent Application Nos. 2014-190028, filed on Sep. 18, 2014, and 2014-190170, filed on Sep. 18, 2014, the entire contents of all of which are incorporated by reference herein.

BACKGROUND OF THE INVENTION

1. Field of the Invention

The present invention relates to an electronic device and a code display method of the electronic device and a recording medium.

2. Description of the Related Art

Recently, various electronic devices for displaying two-dimensional codes such as QR code (which is a trademark) on displays have been developed. For example, in Patent Document 1 (JP-A-2011-076540), there is disclosed a technology for using a document editing device to convert edited text data into a two-dimensional code and display the two-dimensional code and using an imaging device of a mobile phone to image the two-dimensional code, thereby fetching the data, and perform uploading of the data to a desired site, transmitting of the data to a personal computer by mail over the Internet, or the like, thereby easily transmitting the edited text data to another electronic device.

By the way, in a case where a two-dimensional code such as a QR code or a one-dimensional code such as a barcode is printed on a surface of a sheet of paper, the corresponding code is printed in black on the surface of the sheet of white paper, and thus the contrast is high. Therefore, the corresponding code can be more precisely recognized and easily read, for example, by a code reader included in a mobile phone or the like.

However, in general, a non-lighting portion of a display, such as a liquid crystal display, of an electronic device is not white, unlike the surface of the sheet of paper described above, and has a certain color. Therefore, in a case of displaying a code such as a two-dimensional code on the display of the electronic device, the contrast between the non-lighting portion and a lighting portion where the code such as a two-dimensional code is shown is higher than that in a case where the code such as a two-dimensional code is shown on a surface of a sheet of paper.

For this reason, even if the code such as two-dimensional code displayed on the display of the electronic device is read by a reader which is, for example, a mobile phone with a camera, the reader may be unable to precisely recognize the code such as a two-dimensional code.

Meanwhile, tastes in the contrast of the electronic device in a case of displaying normal information differ depending on users. For this reason, in a state where high contrast is set as described above such that a two-dimensional code can be read by a code reader, if normal information is displayed, there is a possibility that a user feels as if the contrast is too excessive.

Also, in a case where it is impossible to read a two-dimensional code displayed on a display by a reader, it is required to adjust the display contrast. However, in this case, it takes time and labor to return the electronic device to a setup mode and adjust the contrast, and the user may feel that it is troublesome.

The present invention was made in view of the above described problems, and an object of the present invention is to provide an electronic device making it possible to precisely read codes such as two-dimensional codes displayed on a display by code readers.

SUMMARY OF THE INVENTION

An electronic device of the present invention includes a display unit, a memory and a processor. The display unit displays at least one of a first display representing a code display and a second display representing a display other than the code display. The processor performs a first display process and a second display process. The first display process controls the display unit such that the display unit performs the first display with contrast ratio of the display unit, based on a contrast data item for first display stored in the memory. The second display process controls the display unit such that the display unit performs the second display with contrast ratio of the display unit, based on a contrast data item for second display stored in the memory.

According to the present invention, it becomes possible to precisely read codes such as two-dimensional codes displayed on a display by code readers, and it becomes possible to display information on the display with a contrast which a user prefers.

DETAILED DESCRIPTION OF THE PREFERRED EMBODIMENT

Figure 1:
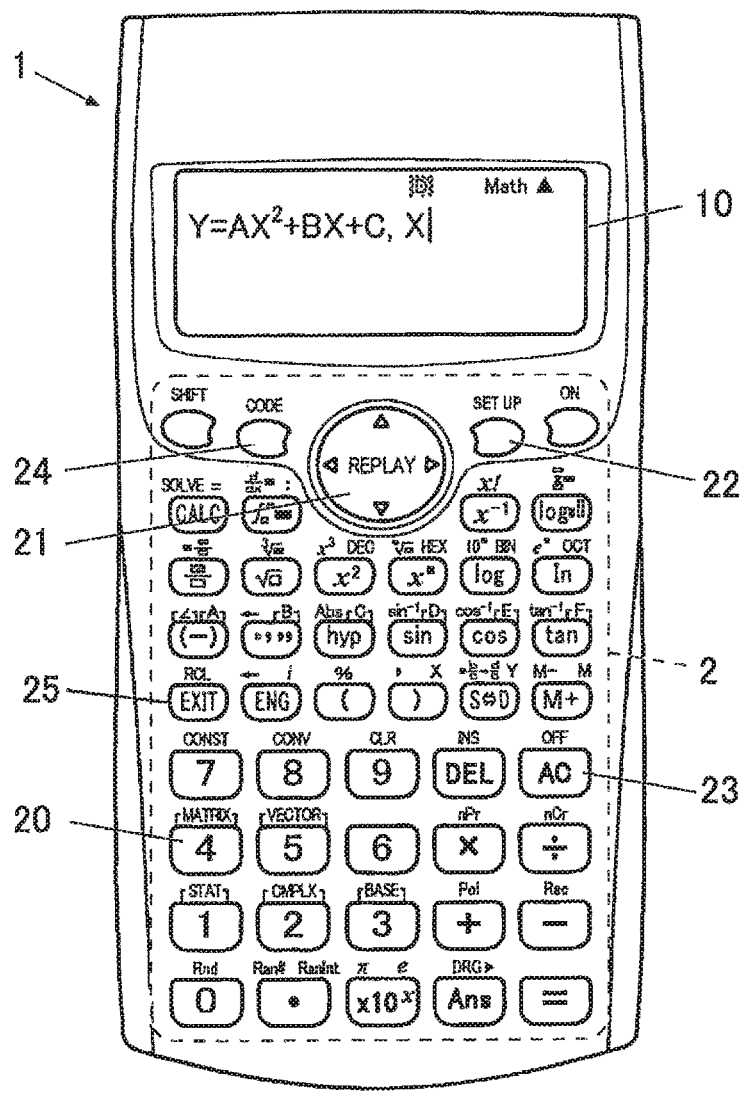
FIG. 1 is a plan view illustrating the outline of a scientific calculator to which an electronic device according to the present invention has been applied.

Hereinafter, embodiments of an electronic device according to the present invention will be described with reference to the accompanying drawings. Also, hereinafter, a case where the electronic device is a scientific calculator will be described. However, the present invention is not limited to the case where the electronic device is a scientific calculator, and can also be applied to any electronic device as long as the corresponding electronic device can display codes such as one-dimensional codes and two-dimensional codes on a display. Also, the scope of the present invention is not limited to examples shown in the drawings.

FIG. 1 is a plan view of a scientific calculator. A scientific calculator 1 includes an input key group 2 including various key groups, and a display 10.

The input key group 2 receives inputs of expression components such as numbers and operator symbols, or various process instructing operations, from a user. The input key group 2 includes numeric keys 20, a cursor key 21, a "SET UP" key 22, an "AC" key 23, a "CODE" key 24, an "EXIT" key 25, and so on.

The numeric keys 20 are keys for receiving number input operations. The cursor key 21 is a key for moving a cursor in predetermined directions in the display 10, and is configured so as to be able to receive inputs with respect to four directions (i.e., up, down, left, and right).

The "SET UP" key 22 is a key which is pressed in order for a transition to a setup mode for setting the contrast of the display 10 of the scientific calculator 1. The "AC" key 23 is a key which is pressed for clearing all calculations having been performed until that moment. Also, the "CODE" key 24 is a key which is pressed for converting data displayed on the display 10 into a two-dimensional code and displaying the two-dimensional code. For example, in a case where a certain expression is displayed on the display 10, if the "CODE" key 24 is operated, the corresponding expression is converted into a two-dimensional code, which is displayed. This displayed code is read by an external reader, whereby it becomes possible to transmit the corresponding expression data to the outside. The "EXIT" key 25 is a key which is pressed for finishing a process. Also, specific functions, usages, and the like of those keys in the present invention will be described below.

The display 10 is composed of a reflection type simple matrix liquid crystal display or the like. The display 10 displays a variety of data such as characters, signs, symbols, expressions, and calculation results according to operations on the input key group 2 and the like, and the above described two-dimensional codes such as QR codes, by a plurality of dots. Also, it is possible to integrally provide a touch panel on the display 10, for example, over the entire display screen. Also, even though a case of displaying a two-dimensional code will hereinafter be described as code display, code display is similarly performed in a case of displaying a one-dimensional code such as a barcode.

[Internal Configuration]

Figure 2:
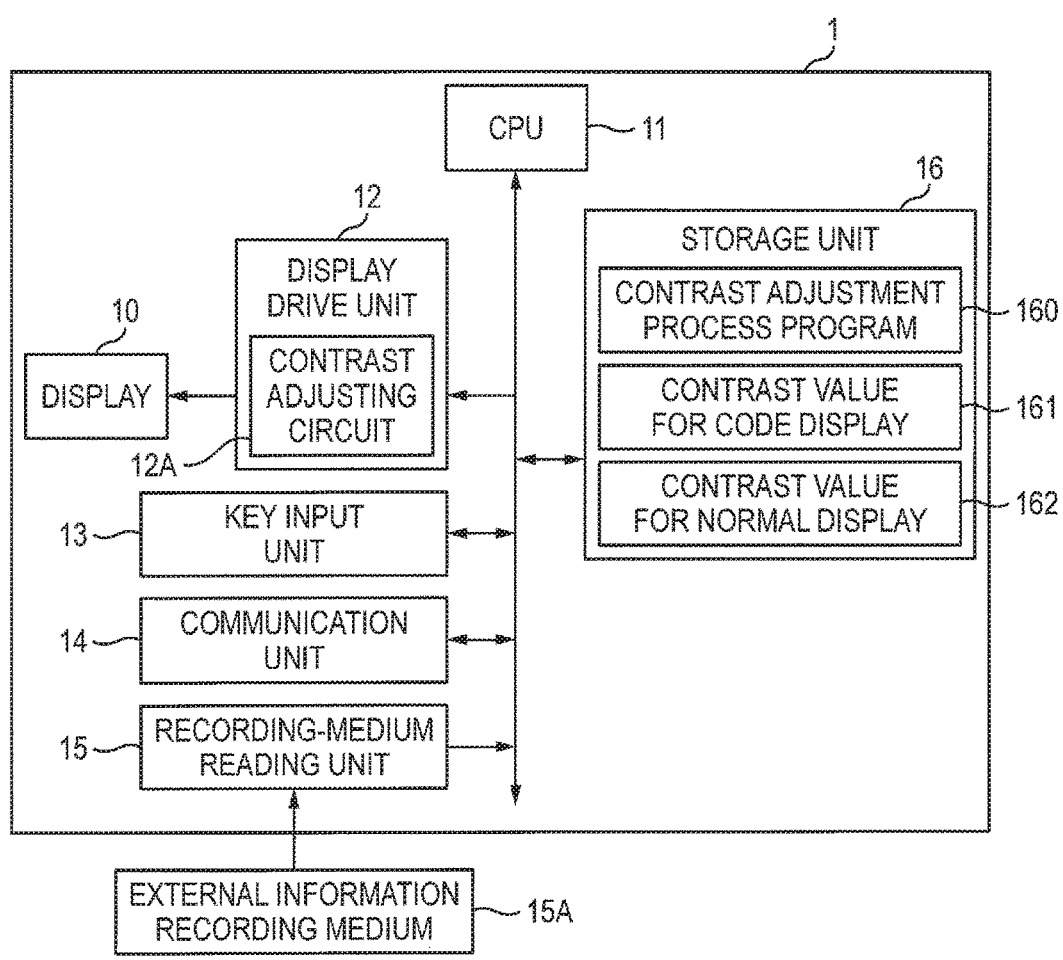
FIG. 2 is a block diagram illustrating the internal configuration of the scientific calculator.

FIG. 2 is a block diagram illustrating the internal configuration of the scientific calculator 1. The scientific calculator 1 is configured so as to include a central processing unit (CPU) 11, a display drive unit 12, a key input unit 13, a communication unit 14, a recording-medium reading unit 15, and a storage unit 16.

The display drive unit 12 controls driving of the display 10 according to control of the CPU 11 such that the display displays a variety of information. Also, the display drive unit 12 includes a contrast adjusting circuit 12A. The contrast adjusting circuit 12A is configured so as to adjust a contrast ratio in a case of performing display on the display 10. In a case of a reflection type simple matrix liquid crystal display, due to changing of a voltage to be applied, the reflectance of a lighting (black) portion and the reflectance of a non-lighting (white) portion change, whereby the reflectance ratio (the ratio of the reflectance of the white portion to the reflectance of the black portion), that is, the contrast ratio changes. Hereinafter, a process of changing a voltage value to be applied to the liquid crystal, thereby changing the contrast ratio will be referred to as contrast adjustment. Also, hereinafter, the contrast ratio will also be referred to simply as the contrast. Like this, in the present embodiment, the display drive unit 12 is configured so as to act as a display drive means for adjusting the contrast and performing control such that display is performed on the display 10 with the adjusted contrast.

The key input unit 13 includes the above described input key group 2, and outputs key input signals corresponding to keys input by operations of the user, to the CPU 11. Then, the CPU 11 receives the key input signals, and performs control such that corresponding expressions are displayed on the display 10, or performs calculations, or performs various processes.

The communication unit 14 performs communication with external devices (such as a server and a computer) connected to, for example, a network (not shown) in a case where the scientific calculator 1 is connected to the network.

The recording-medium reading unit 15 is configured so as to read information from an external information recording medium 15A such as a USB memory which is removably mounted. Also, it may be possible to read a contrast adjustment process program p (to be described below) according to the present invention from the external information recording medium 15A through the recording-medium reading unit 15, and it may be possible to load the contrast adjustment process program p from the scientific calculator 1 into the external information recording medium 15A.

The storage unit 16 is a memory which stores programs and data (including variables, expressions, and so on) for implementing various functions of the scientific calculator 1 and acts as a work area for the CPU 11. Also, in the programs, a program for converting expressions into two-dimensional codes as will be described below is included.

Also, in the present embodiment, the storage unit 16 has a storage area 160 which stores the above described contrast adjustment process program p. Also, the contrast adjustment process program p is a program for causing the CPU 11 to perform a contrast adjustment process (to be described below) (see FIGS. 3, 5, and 7).

Also, in the storage unit 16, two contrast data items for setting the contrast ratio in a case of performing display on the display 10 are stored. In the present embodiment, storage areas 161 and 162 which store a contrast value Cc for code display and a contrast value Cu for normal display as the contrast data items are provided. That is, in the present embodiment, the storage unit 16 acts as a means which stores a contrast data item for code display and a means which stores a contrast data item for normal display other than code display.

The CPU 11 generally controls the individual units of the scientific calculator 1. Specifically, the CPU 11 loads a program designated from a system program and various application programs stored in individual storage areas of the storage unit 16, into the work area of the storage unit 16, and develops the loaded program in the work area, and performs various processes in cooperation with the program developed in the storage unit 16. Also, the CPU 11 controls the display drive unit 12 such that necessary display is performed on the display 10.

[Operation]

Now, an operation of the scientific calculator 1 will be described on the basis of flow charts shown in the drawings.

[With Respect to Contrast Setting Process During Setup]

Figure 3:
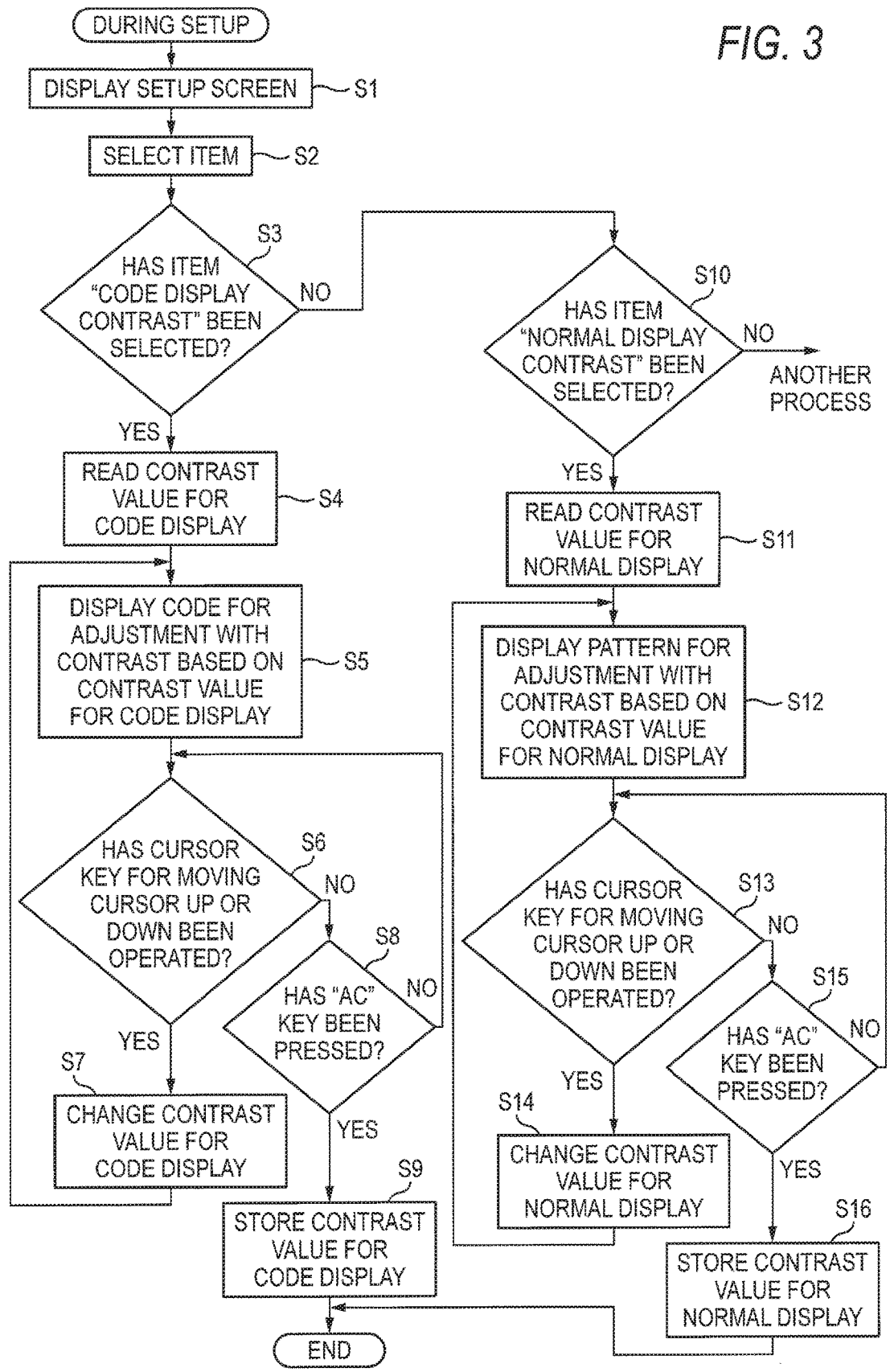
FIG. 3 is a flow chart for explaining a contrast setting process of the scientific calculator.

First, a contrast setting process of the scientific calculator 1 during setup will be described on the basis of a flow chart shown in FIG. 3.

It is assumed that each of the contrast value Cc for code display and the contrast value Cu for normal display can take data values "00(h)" to "1F(h)" such that it is possible to adjust each contrast ratio in 31 steps. Also, it is assumed that in a default state (that is, during shipment of the scientific calculator 1 from the factory, during purchase of the scientific calculator by the user, or the like), predetermined values are retained as the contrast value Cc for code display and the contrast value Cu for normal display in the storage areas 161 and 162 (see FIG. 2) of the storage unit 16, respectively. Here, it is assumed that a value "0F(h)" which is the median between the above described values "00(h)" and "1F(h)" is retained in each of the storage areas 161 and 162. However, different values may be retained.

Figure 4A:
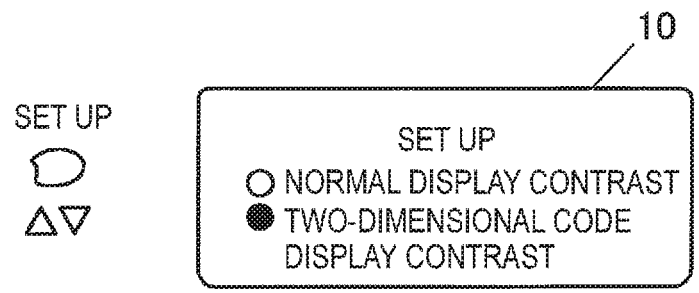
FIG. 4A is a view illustrating an example of a setup screen.

If the "SET UP" key 22 is pressed, in STEP S1, the CPU 11 of the scientific calculator 1 controls the display drive unit 12 such that the display drive unit displays a setup screen as shown in FIG. 4A on the display 10. Subsequently, in STEP S2, the CPU 11 prompts the user to select any one of two items "NORMAL DISPLAY CONTRAST" and "TWO-DIMENSIONAL CODE DISPLAY CONTRAST" by operating the cursor key 21 for moving the cursor up or down.

If the user selects the item "TWO-DIMENSIONAL CODE DISPLAY CONTRAST" ("YES" in STEP S3), in STEP S4, the CPU 11 reads the contrast value Cc for code display from the storage unit 16, and sets the contrast value Cc in a register (not shown) of the inside of the contrast adjusting circuit 12A. As described above, in the default state, the contrast value Cc for code display is "0F(h)".

Figure 4B:
FIG. 4B is a view illustrating an example of a two-dimensional code for adjustment.

The contrast adjusting circuit 12A of the display drive unit 12 adjusts a contrast for performing code display on the display 10, on the basis of the contrast value Cc set for code display. Subsequently, in STEP S5, a two-dimensional code for adjustment as shown in FIG. 4B is displayed with the adjusted contrast.

Then, the user tries to read the two-dimensional code for adjustment displayed on the display 10 by a code reader which is, for example, a mobile phone having an imaging function. In a case where the reader cannot recognize and read the two-dimensional code, the user operates the cursor key 21 for moving the cursor up or down, according to guide display shown in FIG. 4B. If the operation on the cursor key 21 for moving the cursor up or down is detected ("YES" in STEP S6), in STEP S7, the CPU 11 changes the contrast value Cc for code display, according to the user's operation on the cursor key 21.

That is, in a case where the cursor key 21 for moving the cursor up has been operated, the CPU 11 increases the contrast value Cc for code display by "1(h)". Subsequently, in STEP S5, the display drive unit 12 changes the contrast to a contrast based on the increased contrast value Cc for code display, and displays the two-dimensional code for adjustment (see FIG. 4B) with the adjusted contrast.

In short, in this case, the contrast of the two-dimensional code for adjustment displayed becomes slightly higher. In a case where the user has operated the cursor key 21 for moving the cursor down, a process opposite to the above described process is performed. Therefore, in this case, the contrast becomes slightly lower.

Also, the reader for reading the displayed two-dimensional code is not particularly limited, and may be not only a mobile phone but also a smart phone, a tablet terminal, a portable computer, a digital camera, or the like as long as it can read the two-dimensional code or the like displayed on the display 10.

Subsequently, in a state where the display contrast of the two-dimensional code has been changed, the user tries to read the two-dimensional code by the reader. Then, the above described processes of STEPS S5 to S7 are performed until the reader recognizes and reads the two-dimensional code displayed on the display 10.

After the above described contrast adjustment finishes, if the user presses the "AC" key 23 ("YES" in STEP S8), the CPU 11 overwrites the storage area 161 of the storage unit 16 with the contrast value Cc for code display retained in the register at that moment, thereby storing the contrast value Cc, in STEP S9, and finishes the contrast setting process during setup.

Meanwhile, if the item "NORMAL DISPLAY CONTRAST" is selected ("NO" in STEP S3 and "YES" in STEP S10), in STEP 511, the CPU 11 reads the contrast value Cu for normal display from the storage unit 16, and sets the contrast value Cu in the register (not shown) of the inside of the contrast adjusting circuit 12A. As described above, in the default state, the contrast value Cc for code display is "0F(h)".

Figure 4C:
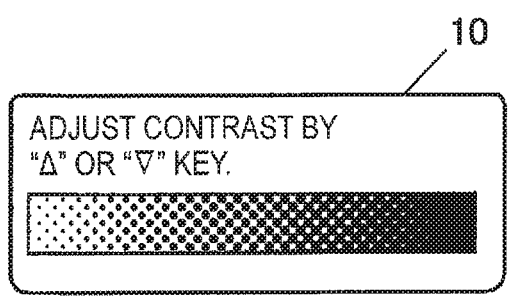
FIG. 4C is a view illustrating an example of a pattern for adjustment.

In STEP S12, in the same way as the described above way, the display drive unit 12 adjusts the contrast for performing normal display on the display 10, to a contrast based on the contrast value Cu set for normal display, by the contrast adjusting circuit 12A, and displays a gradation pattern for adjustment, for example, as shown in FIG. 4C, with the adjusted contrast, on the display 10.

Figure 6A:
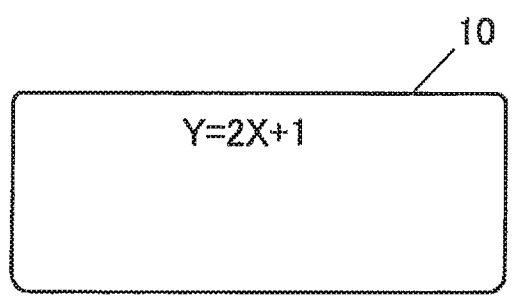
FIG. 6A is a view illustrating an example of data which is displayed on a display.

Also, instead of the gradation pattern for adjustment as shown in FIG. 4C, data such as an expression or characters as shown in FIG. 6A (to be described below) can be displayed. Also, even in a case of displaying a pattern for adjustment, instead of the gradation pattern as shown in FIG. 4C, any other pattern may be displayed.

If the pattern for adjustment as shown in FIG. 4C is displayed, the user can grasp how a bright display portion and a dark display portion are displayed with the adjusted contrast, at a glance, and there is an advantage that it becomes easier to perform contrast adjustment.

Further, in this case, if the user operates the cursor key 21 for moving the cursor up or down according to guide display shown in FIG. 4C on the basis of the taste of the user in which the contrast is excessive or it is desired to slightly increase the contrast ("YES" in STEP S13), in STEP S14, the CPU 11 changes the contrast value Cu for normal display according to the user's operation on the cursor key 21.

That is, in a case where the user has operated the cursor key 21 for moving the cursor up, the CPU 11 increases the contrast value Cu for code display retained in the register of the inside of the contrast adjusting circuit 12A by "1(h)". Subsequently, the display drive unit 12 changes the contrast to a contrast based on the increased contrast value Cu for normal display.

Subsequently, in STEP S12, the display drive unit 12 displays the pattern for adjustment on the display 10 with the contrast changed on the basis of the contrast value Cu for normal display changed as described above. Meanwhile, for example, in a case where the user has operated the cursor key 21 for moving the cursor down, a process opposite to the above described process is performed.

The process of changing the display contrast of the pattern for adjustment is performed as described above is performed until the user likes the contrast.

Then, if the user determines that the contrast at that moment is good, and presses the "AC" key 23 ("YES" in STEP S15), the CPU 11 overwrites the storage area 162 of the storage unit 16 with the contrast value Cu for code display retained in the register at that moment, thereby storing the contrast value Cu, in STEP S16, and finishes the contrast setting process during setup.

[With Respect to Operation/Display Process During Use]

Now, an operation/display process of the scientific calculator 1 during use will be described on the basis of a flow chart shown in FIG. 5.

If the scientific calculator 1 is powered on in STEP S21, in STEP S22, the CPU 11 reads the contrast value Cu for normal display from the storage unit 16, and sets the contrast value Cu in the register of the inside of the contrast adjusting circuit 12A.

Due to this setting, in a case of displaying data such as an expression on the display 10, the scientific calculator 1 performs the display with a contrast based on the contrast value Cu for normal display (see FIG. 6A).

Then, if the user performs a key operation, and the key operation is not for issuing a code display command, that is, a command for displaying a two-dimensional code ("NO" in STEP S23), the CPU 11 performs a normal calculator operation based on inputs of numbers, expressions, and the like, in STEP S24, and displays expressions, characters, and the like on the basis of that normal calculator operation on the display 10 in STEP S25. In this case, the display is performed with a contrast based on the contrast value Cu for normal display.

Meanwhile, in a case where the user wants to convert data (for example, an expression shown in FIG. 6A) displayed on the display 10 into a two-dimensional code, the user operates the "CODE" key 24. In the present embodiment, the user can convert data into a code and display the code on the display 10 by one operation (pressing of the "CODE" key 24).

If the CPU 11 detects pressing of the "CODE" key 24 ("YES" in STEP S23), in STEP S26, the CPU 11 determines whether the displayed data is encodable data. If it is determined that the displayed data is not encodable ("NO" in STEP S26), the CPU 11 performs error display, for example, display of a message "IT IS IMPOSSIBLE TO CONVERT THE DATA TO A TWO-DIMENSIONAL CODE.", in STEP S27, and returns to the normal operation of STEP S24.

Meanwhile, if it is determined that the displayed data is encodable ("YES" in STEP S26), in STEP S28, the CPU 11 converts the displayed data into a two-dimensional code. Subsequently, in STEP S28, the CPU 11 reads the contrast value Cc for code display stored in the storage unit 16, and sets the contrast value Cc in the register of the inside of the contrast adjusting circuit 12A of the display drive unit 12.

Figure 6B:
FIG. 6B is a view illustrating a display example of a two-dimensional code.

Subsequently, in STEP S30, the contrast adjusting circuit 12A of the display drive unit 12 adjusts the contrast on the basis of the contrast value Cc for code display, and displays the two-dimensional code on the display 10 as shown in FIG. 6B. Then, the user tries to read the two-dimensional code displayed on the display 10, by the reader which is, for example, a mobile phone.

If the two-dimensional code is read, in STEP S31, the user presses the "EXIT" key 25, thereby releasing the code display. If the code display is released, the CPU 11 returns to the process of STEP S22 in which the CPU 11 resets the contrast value Cu for normal display in the display drive unit 12, and then returns to the display state based on the contrast for normal display.

As described above, in the scientific calculator 1, it is possible to separately set a contrast for displaying a two-dimensional code on the display 10 and a contrast for normally displaying data such as characters and expressions on the display 10. Therefore, in a case of displaying a two-dimensional code, it is possible to precisely read the two-dimensional code, and in a case of data such as an expression, it is possible to display the data with a contrast which the user prefers.

[With Respect to Code Display Contrast Adjustment Process During Use]

Even though the contrast value Cc for code display is adjusted and set during setup, when the scientific calculator 1 is actually used, even if the user tries to read a displayed two-dimensional code by a reader, a case where it is impossible to successfully read the two-dimensional code due to some reasons such as a reason that the type of the reader is not appropriate may occur.

For this reason, the scientific calculator 1 may be configured such that even in a case where a code is displayed in STEP S30 of the above described embodiment, it is possible to adjust the contrast for code display. Hereinafter, a contrast adjustment process of the scientific calculator 1 when code display is being performed will be described on the basis of a flow chart shown in FIG. 7.

Figure 5:
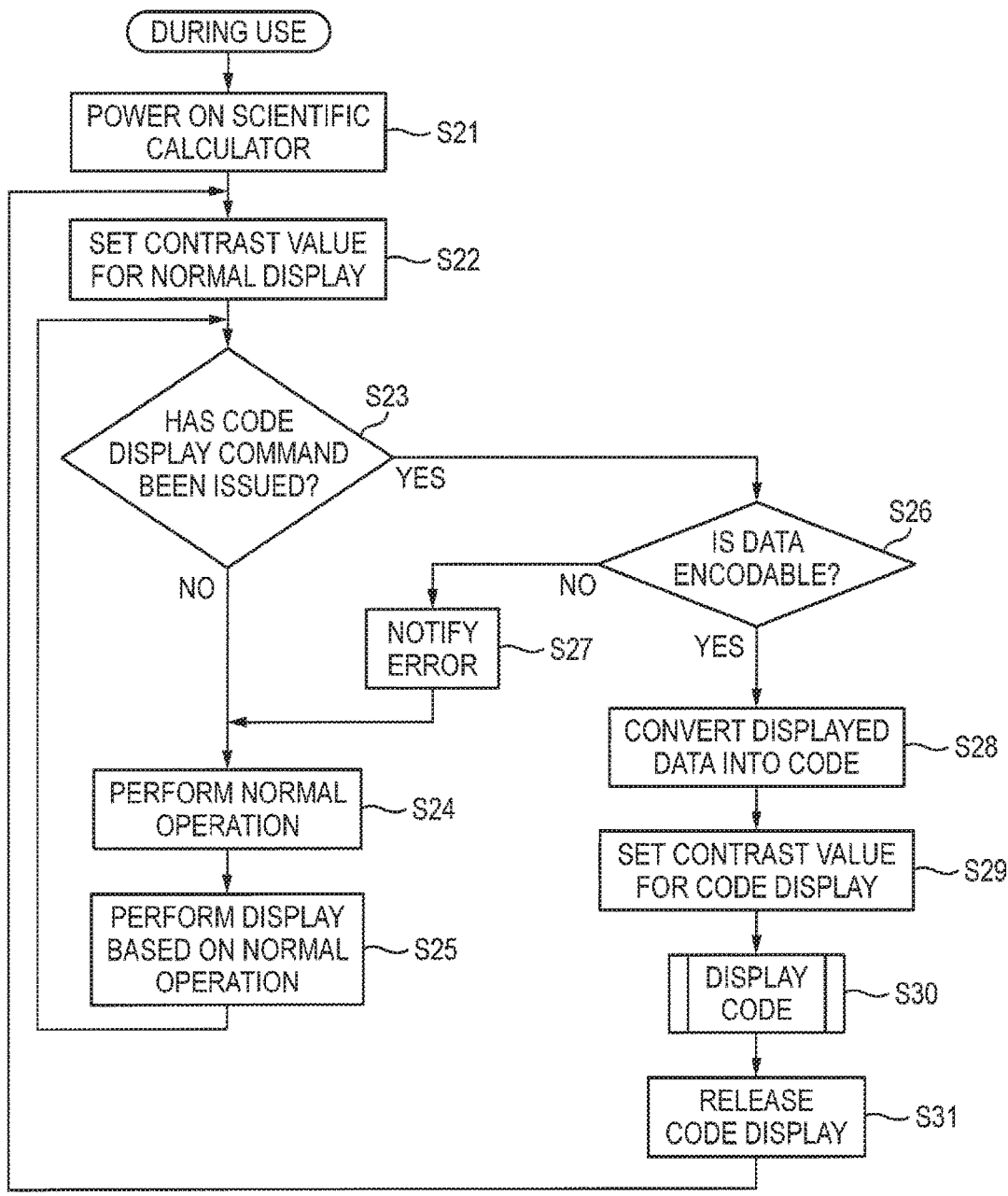
FIG. 5 is a flow chart for explaining an operation/display process of the scientific calculator during use.
Figure 7:
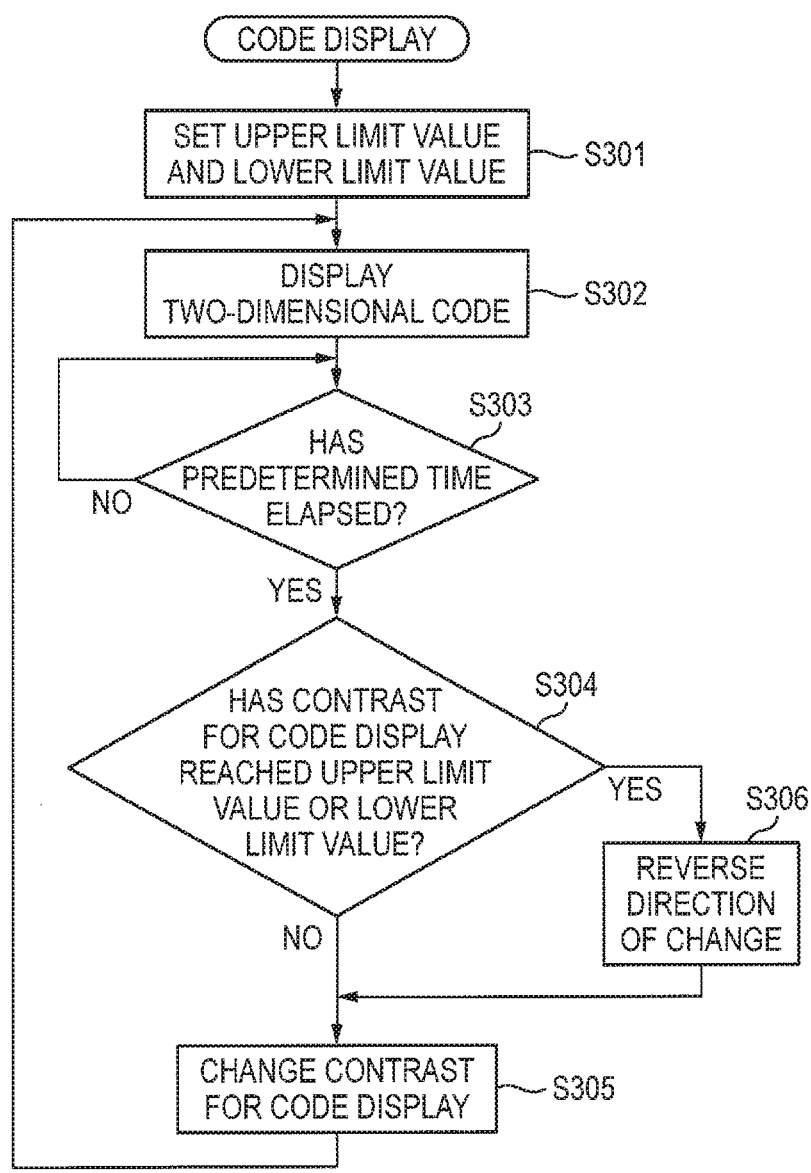
FIG. 7 is a flow chart for explaining a code display contrast adjustment process of the scientific calculator during use.

The code display contrast adjustment process shown in FIG. 7 is performed in the code display of STEP S30 of the flow chart of FIG. 5. In this process, at intervals of a predetermined time, the contrast of the two-dimensional code is changed and the two-dimensional code is displayed with the changed contrast.

Specifically, during the code display of STEP S30, first, in STEP S301, the CPU 11 sets an upper limit value Ccmax and a lower limit value Ccmin for changing the contrast on the basis of the contrast value Cc for code display retained in the register.

At this time, the CPU 11 obtains a value by adding, for example, "3(h)" to the contrast value Cc for code display retained in the register, and sets the obtained value as the upper limit value Ccmax. Also, the CPU 11 obtains a value by subtracting, "3(h)" from the contrast value Cc, and sets the obtained value as the lower limit value Ccmin. Alternatively, it is possible to set the upper limit value Ccmax and the lower limit value Ccmin to the maximum value "1F(h)" and the minimum value "00(h)" which the contrast value Cc for code display can take, respectively.

The value which is added or subtracted is not limited to "3(h)", and the value which is added and the value which is subtracted do not need to be equal.

Subsequently, in STEP S302, the CPU 11 displays the two-dimensional code on the display 10, with a contrast based on the contrast value Cc for code display set at that moment.

Then, if a predetermined time, for example, 5 seconds elapse ("YES" in STEP S303), the CPU 11 determines whether the contrast value Cc for code display has reached the upper limit value Ccmax or the lower limit value Ccmin. If it is determined that the contrast value Cc has not reached any limit value ("NO" in STEP S304), in STEP S305, the CPU 11 increases the contrast value Cc for code display retained in the register, by "1(h)". Subsequently, in STEP S302, the CPU 11 displays the two-dimensional code on the basis of the changed contrast value Cc for code display.

If the contrast value is increased, the display contrast of the two-dimensional code becomes slightly higher. Then, the user tries to read the two-dimensional code displayed with the changed contrast, by a code reader. If it is possible to read the two-dimensional code, in STEP S31 of FIG. 5, the user presses the "EXIT" key 25, thereby releasing the code display. As a result, the code display contrast adjustment process during use shown in FIG. 7.

Meanwhile, in a case where it is impossible to successfully read the two-dimensional code by the reader, when the predetermined time elapses ("YES" in STEP S303), if the contrast has not reached the upper limit value Ccmax ("NO" in STEP S304), in STEP S305, the CPU 11 further increases the contrast value Cc for code display by "1(h)". Then, if the changed contrast value Cc for code display has reached the upper limit value Ccmax ("YES" in STEP S304), in STEP S305, the CPU 11 reverses the direction of change, and decreases the contrast value Cc for code display by "1(h)".

Figure 8A:
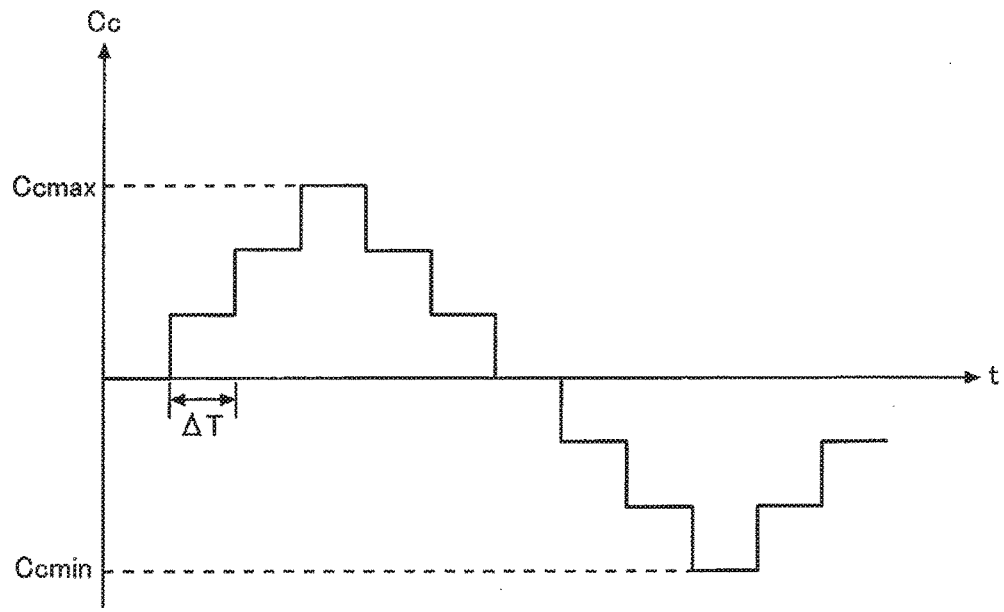
FIG. 8A is a graph illustrating an example of a method of changing a contrast value for code display.

As described above, the CPU 11 increases or decreases the contrast value Cc for code display, in a step wise, at intervals of a predetermined time ΔT, as shown in FIG. 8A, until the code display is released.

Figure 8B:
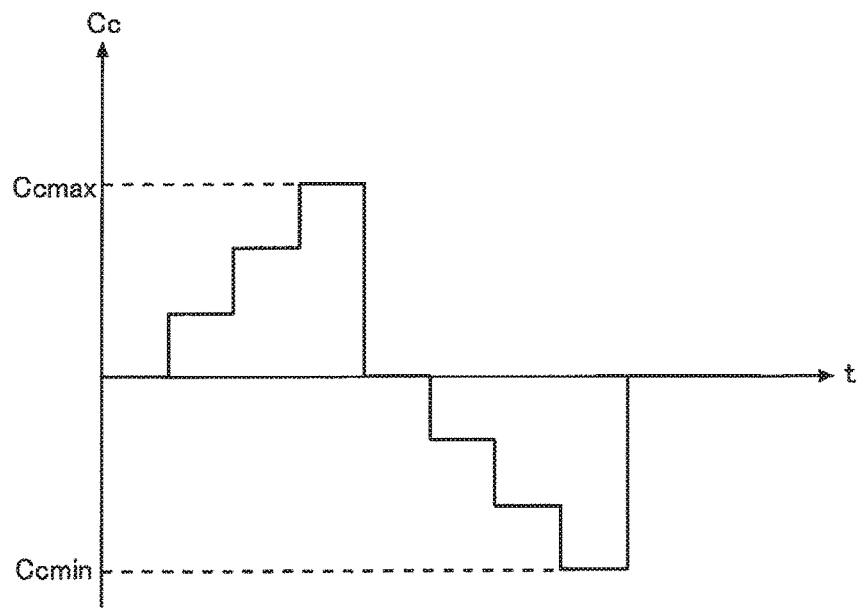
FIG. 8B is a graph illustrating another example thereof.

Also, as another method of changing the contrast value Cc for code display, as shown in FIG. 8B, if the contrast value Cc for code display reaches the upper limit value Ccmax, the CPU 11 may return the contrast value Cc to the original contrast value Cc for code display (that is, the contrast value Cc for code display stored in the storage area 161 of the storage unit 16), and decrease the contrast value Cc from the original contrast value Cc.

In this case, even though it is impossible to read the two-dimensional code displayed on the basis of the contrast value Cc for code display set in advance, by the reader, since the contrast is increased or decreased at intervals of the predetermined time, at a certain timing, it becomes possible to read the two-dimensional code by the reader.

Second Embodiment

In the above description, a process in which the CPU 11 of the scientific calculator 1 automatically changes the contrast of the displayed two-dimensional code has been described. Hereinafter, a form in which the contrast of a two-dimensional code is changed by an operation of the user will be described.

[With Respect to Contrast Setting Process During Use]

Figure 9:
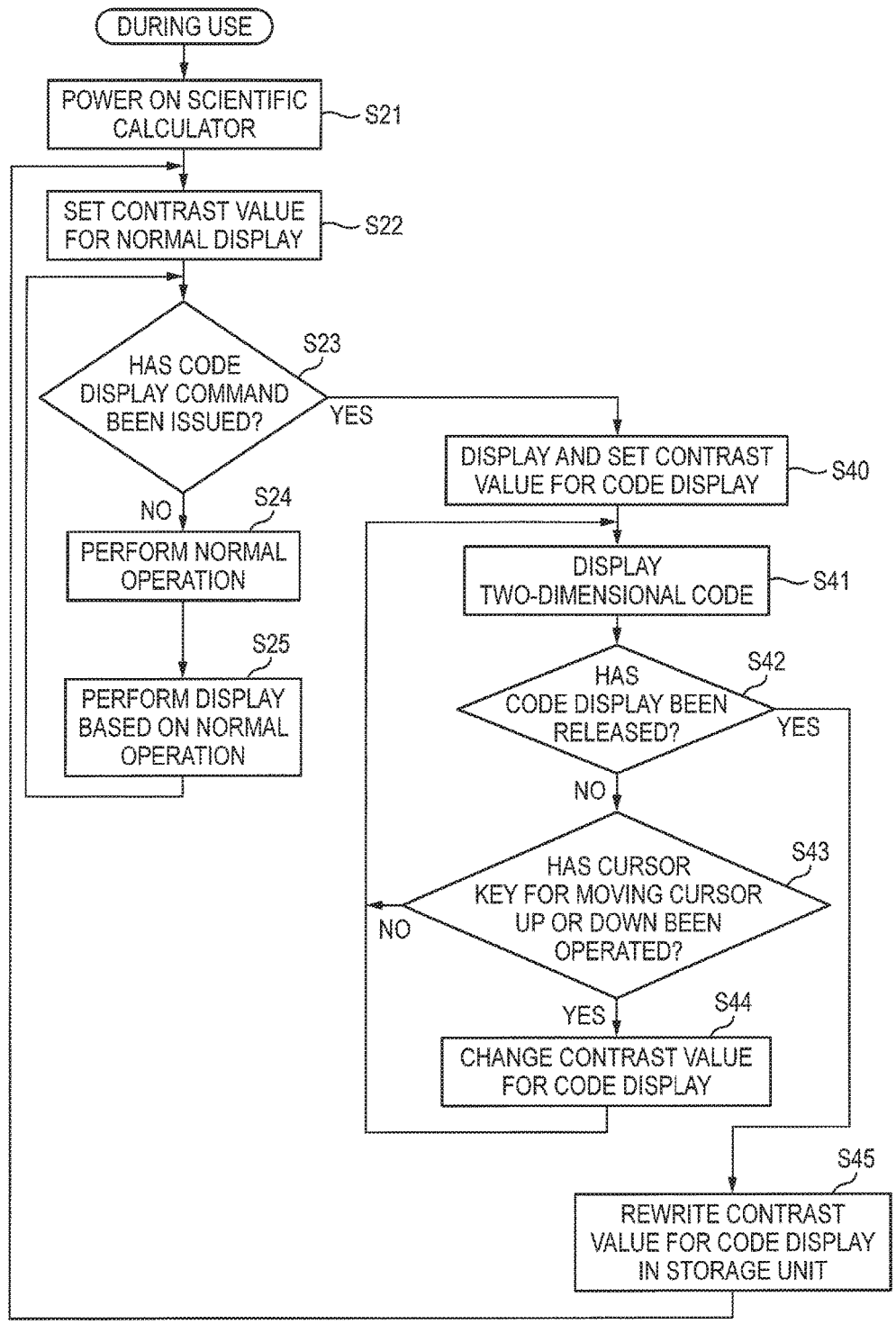
FIG. 9 is a flow chart for explaining an operation/display process of a scientific calculator during use according to a second embodiment.

FIG. 9 is a flow chart illustrating a process of a scientific calculator 1 in which the user adjusts the contrast. In FIG. 9, processes identical to those of the flow chart of FIG. 5 are denoted by the same reference symbols.

The configuration of the scientific calculator 1 is as shown in FIG. 2, and in the storage unit 16, the contrast values Cc and Cu set during setup are retained.

If the scientific calculator 1 is powered on in STEP S21, in STEP S22, the CPU 11 reads the contrast value Cu for normal display from the storage unit 16, and sets the contrast value Cu in the register of the inside of the contrast adjusting circuit 12A.

Figure 10A:
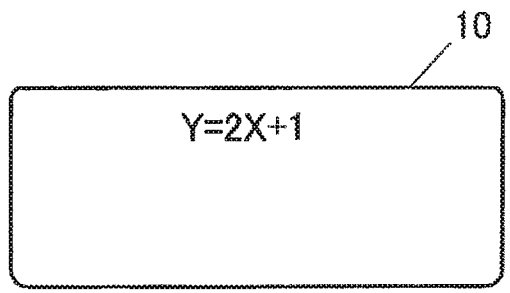
FIG. 10A is a view illustrating an example of data which is displayed on the display.

If the user performs a key operation for performing a normal calculation, the scientific calculator 1 performs a normal operation according to input keys, in STEP S24, and performs display in STEP S25. At this time, the scientific calculator 1 adjusts the contrast on the basis of the contrast value Cu for normal display, and displays data with the adjusted contrast on the display 10 (see FIG. 10A).

Figure 10B:
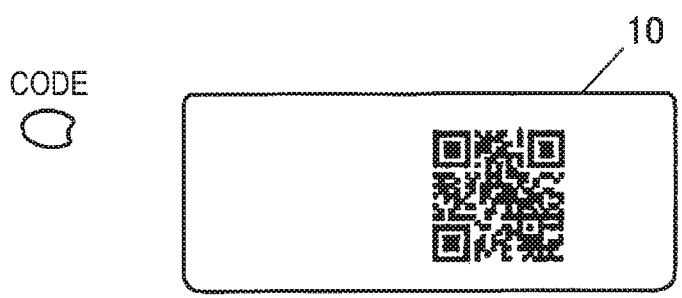
FIG. 10B is a view illustrating an example of a two-dimensional code.

If the user presses the "CODE" key 24, the CPU 11 converts the data (for example, an expression shown in FIG. 10A) displayed on the display 10, into a two-dimensional code, and displays the two-dimensional code as shown in FIG. 10B.

Specifically, if it is determined that the "CODE" key 24 has been pressed ("YES" in STEP S23), in STEP S40, the CPU 11 reads the contrast value Cc for code display from the storage unit 16, and sets the contrast value Cc for code display in the register of the inside of the contrast adjusting circuit 12A. Subsequently, the CPU 11 converts the data such as an expression displayed on the display 10, into a two-dimensional code.

Subsequently, in STEP S41, on the basis of the contrast value Cc for code display, the display drive unit 12 displays the two-dimensional code on the display 10 as shown in FIG. 10B.

Then, the user tries to read the displayed two-dimensional code by a reader such as a smart phone. If it is possible to read the two-dimensional code by the reader, the user performs an operation for releasing the code display ("YES" in STEP S42). Meanwhile, in a case where the reader cannot read the two-dimensional code, the user performs a predetermined key input, that is, an up or down key ("Δ" or "∇" key) input using the cursor key 21.

If the user's operation on the cursor key 21 is detected ("YES" in STEP S43), in STEP S44, according to the key input, the CPU 11 changes the contrast value Cc for code display set in the register. That is, in a case where the cursor key for moving the cursor up has been operated as described above, the CPU 11 increases the contrast value Cc for code display set in the register, by "1(h)".

Figure 10C:
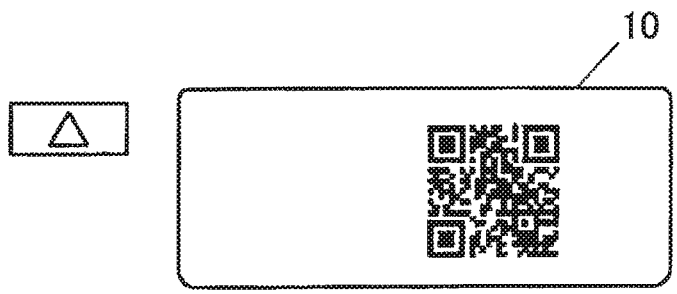
FIG. 10C is a view illustrating a state where the two-dimensional code is displayed with a changed contrast.

Subsequently, the display drive unit 12 adjusts the contrast for code display on the basis of the increased contrast value Cc for code display, as described above, and displays the two-dimensional code, as shown in FIG. 10C, in STEP S41.

In short, in this case, although not expressed in FIG. 10C, the contrast of the displayed two-dimensional code becomes slightly higher. Also, although not shown, in a case where the user has operated the cursor key 21 for moving the cursor down, a process opposite to the above described process is performed. Therefore, in this case, the contrast of the displayed two-dimensional code becomes slightly lower.

In this state, the user re-tries to read the displayed two-dimensional code by the reader such as a smart phone, and the processes of STEPS S29, S30, and S27, that is, the process of changing the contrast value Cc for code display is repeated until it is possible to read the two-dimensional code by the reader.

Then, if the reader can read the two-dimensional code displayed on the display 10 of the scientific calculator 1, the user presses the "EXIT" key 25, thereby releasing and finishing the code display ("YES" in STEP S42).

If the code display releasing operation is performed ("YES" in STEP S42), in STEP S45, the CPU 11 overwrites the contrast value Cc for code display stored in the storage area 161 of the storage unit 16, with the contrast value Cc for code display retained in the register of the contrast adjusting circuit 12A at that moment.

Then, the CPU 11 returns the display on the display 10 to a state where display is performed with a contrast based on the contrast value Cu for normal display (in STEP S22 and the subsequent steps).

As described above, when the code is displayed by the scientific calculator 1, the user can adjust the code display contrast of the two-dimensional code by only performing a cursor key input for moving the cursor up or down ("Δ" or "∇" key).

Also, instead of a cursor key input for moving the cursor up or down, a cursor key input for moving the cursor right or left, or a key input of a "+" key or a "−" key can be performed, and the key input method for changing the contrast can be set to an appropriate method.

Third Embodiment

One reader for reading two-dimensional codes displayed on the scientific calculator 1 does not need to be always used. That is, one user may read two-dimensional codes by a tablet terminal, a portable computer, digital camera, and the like besides a mobile phone.

Also, different users may read two-dimensional codes displayed on the scientific calculator 1 by mobile phones of different makers.

For these cases, if a contrast value Cc for code display appropriate for the reader of each of one or more users is stored, even if a reader is replaced with another reader, it is possible to select and use a contrast value Cc for code display appropriate for the replaced reader, thereby capable of smoothly and precisely performing a reading operation.

In a third embodiment, a scientific calculator 1 configured as described above will be described. Also, with respect to contents identical to the contents described in the first embodiment, steps of performing processes identical to the processes of the steps of the flow chart (especially see FIG. 5) described in the first embodiment are denoted by the same reference symbols and will not be described.

Figure 11:
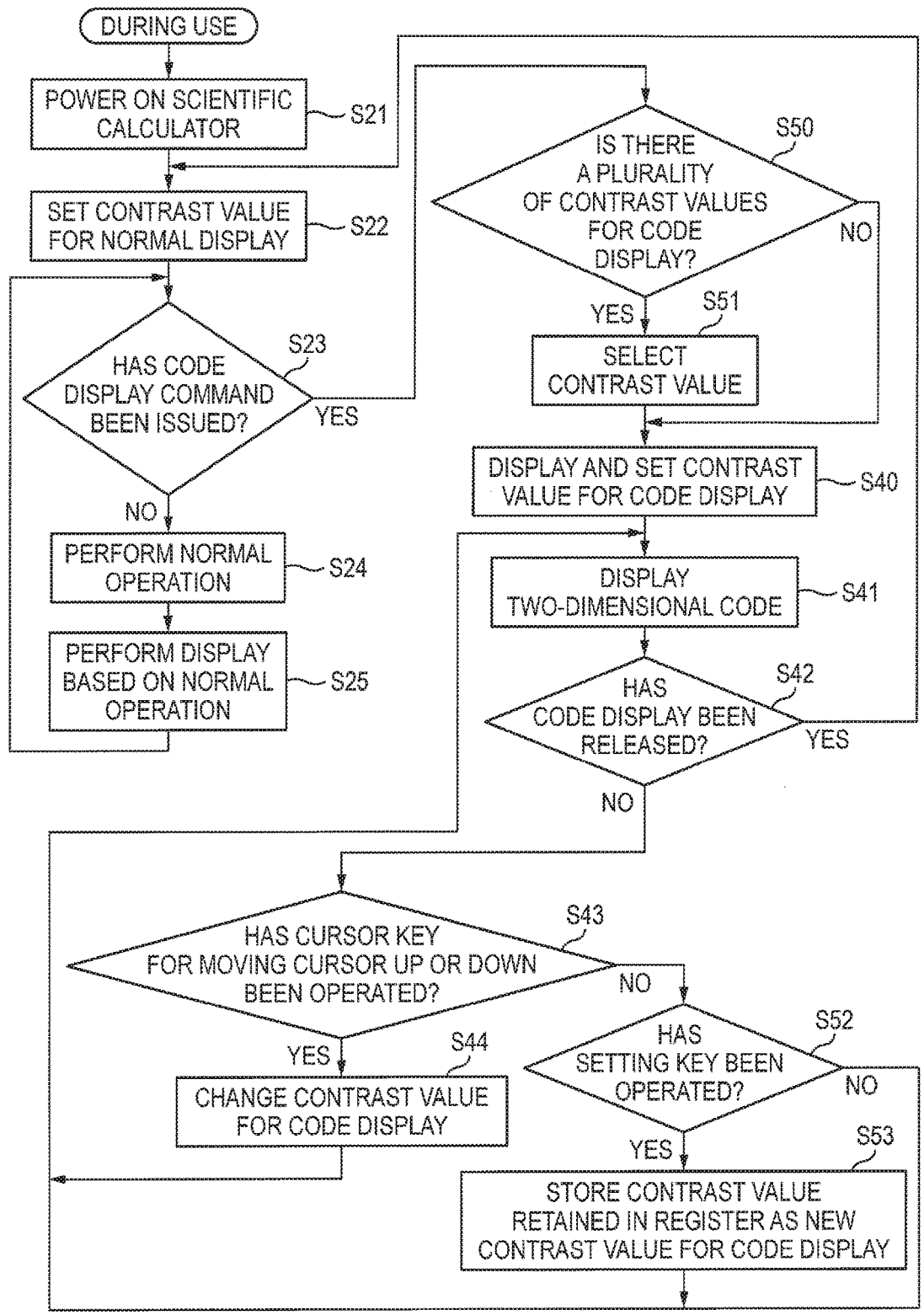
FIG. 11 is a flow chart for explaining an operation/display process of a scientific calculator during use according to a third embodiment.

FIG. 11 is a flow chart illustrating a contrast value setting process of the scientific calculator 1 during use according to the third embodiment.

The present embodiment is the same as the first embodiment in the process of STEP S24 which is performed after the scientific calculator 1 is powered on in STEP S21 and in which the CPU 11 performs a normal operation of displaying an expression or the like on the display 10 or performing a calculation, but is different from the first embodiment in a process which is performed after the user issues a code display command by pressing the "CODE" key 24 ("YES" in STEP S23).

Figure 12:
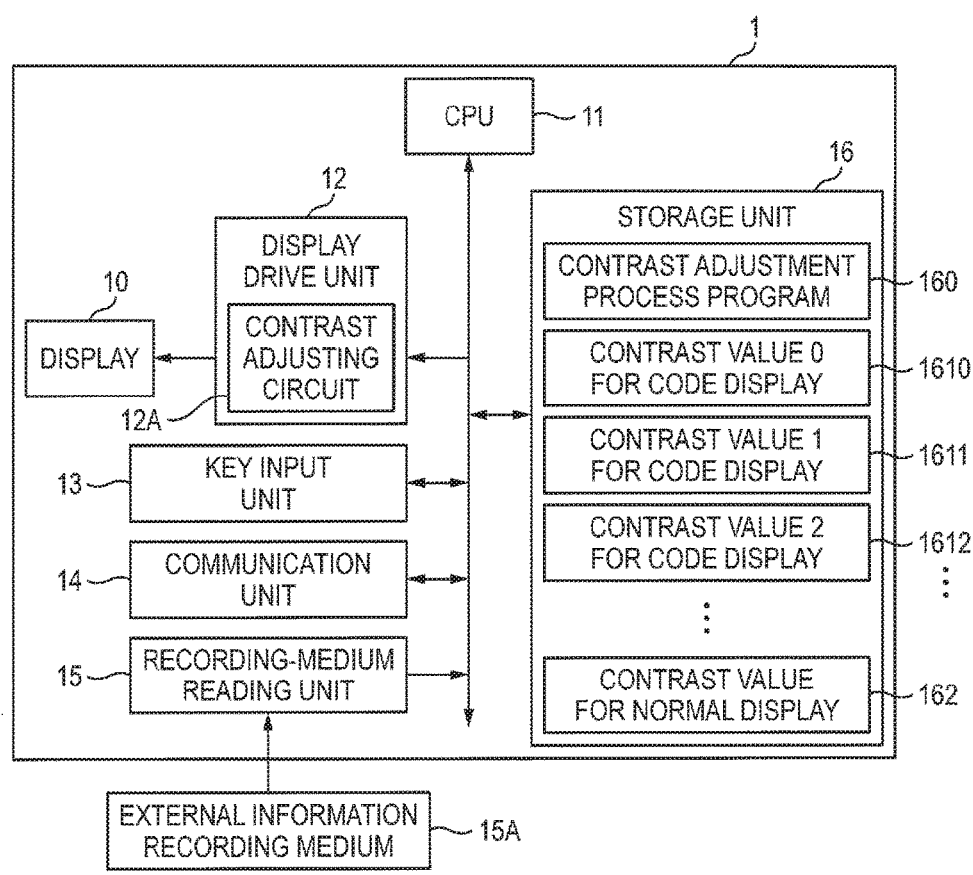
FIG. 12 is a block diagram illustrating the internal configuration of the scientific calculator according to the third embodiment.

The internal configuration of the scientific calculator 1 is different from that of the first embodiment shown in FIG. 2 in that the storage unit 16 has a plurality of storage areas 1610, 1611, 1612, and . . . , as storage areas for storing contrast values Cc for code display as shown in FIG. 12. In the storage areas 1610, 1611, 1612, and . . . , contrast values Cc0, Cc1, Cc2, and . . . for code display are individually stored, respectively.

At the start of use of the scientific calculator 1, at least the storage area 1610 retains a default value "0F(h)", and retains a contrast value Cc for code display set as described above during setup, as the contrast value Cc0 for code display.

Figure 13A:
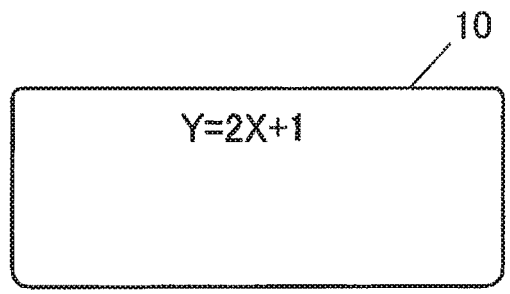
FIG. 13A is a view illustrating an example of an expression displayed on the display.

Also, in a case where an operation for commanding code display of a displayed expression (see FIG. 13A) is performed, if a plurality of contrast values Cc for code display is retained in the storage unit 16, the CPU 11 displays a screen (see FIG. 13B) for prompting the user to select any one, and adjusts the contrast on the basis of a selected contrast value Ccc for code display, and performs control such that code display (see FIG. 13C) is performed.

Specifically, if the user presses the "CODE" key 24 ("YES" in STEP S23), in STEP S50, the CPU 11 determines whether a plurality of contrast values Cc for code display is retained in the storage unit 16. At the start of use of the scientific calculator 1, only one contrast value Cc0 for code display is retained in the storage unit 16. Therefore, in this case ("NO" in STEP S50), similarly in the first embodiment, in STEP S40, the CPU 11 reads the contrast value Cc0 for code display from the storage unit 16, and sets the contrast value Cc0 in the register of the contrast adjusting circuit 12A, without performing the process of STEP S51.

Figure 13B:
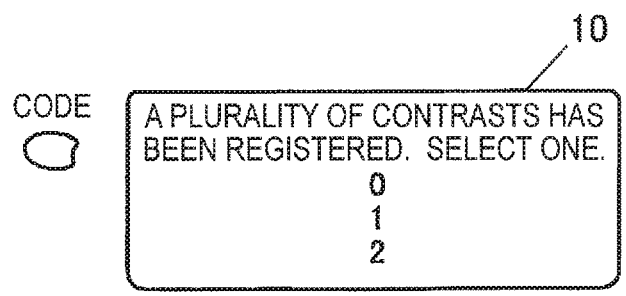
FIG. 13B is a view illustrating an example of a screen for prompting a user to select a contrast.
Figure 13C:
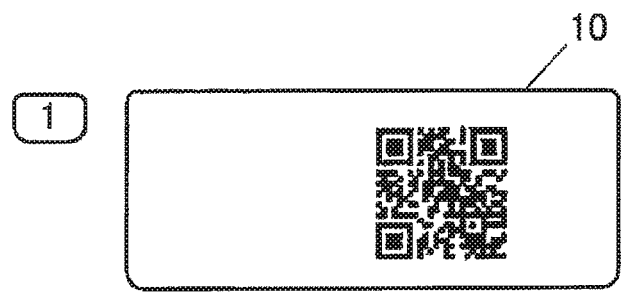
FIG. 13C is a view illustrating an example of a two-dimensional code displayed with a selected contrast.

Meanwhile, in a case where a plurality of contrast values Cc for code display is retained in the storage unit 16 ("YES" in STEP S50), the CPU 11 displays a screen for prompting the user to select one of the plurality of contrast values Cc for code display as shown in FIG. 13B. In the case of FIG. 13B, numbers "0", "1", and "2" corresponding to three contrast values Cc0, Cc1, and Cc2 for code display are displayed on the display 10 of the scientific calculator 1, such that the user can select one.

Also, in this case, in the vicinities of the numbers "0", "1", and "2" on the screen, the types of corresponding readers (that is, a mobile phone, a smart phone, a tablet terminal, a portable computer, a digital camera, and so on), user names, or the like can be displayed such that the user can refer to them for selecting one contrast value.

If the user selects any one number by a numeric key 20, the CPU 11 reads the selected contrast value Cc for code display from the storage unit 16 in STEP SM, and sets the selected contrast value Cc in the register of the contrast adjusting circuit 12A in STEP S40. Also, in FIG. 13C, a case where the contrast value Cc1 for code display has been selected is shown.

Subsequently, in STEP S41, the CPU 11 converts the data such as an expression displayed on the display 10, into a two-dimensional code, and displays the two-dimensional code on the display 10, with a contrast based on the set contrast value Cc1 for code display.

After the two-dimensional code is displayed, the user performs an operation of reading the displayed two-dimensional code by a reader such as a smart phone. In a case where it is impossible to read the two-dimensional code by the reader, if a key input of the cursor key 21 by the user is received ("YES" in STEP S43), the CPU 11 changes the contrast value Cc for code display in STEP S44, and displays the two-dimensional code on the display 10 with the changed contrast in STEP S41.

Meanwhile, in a case where it is possible to read the two-dimensional code by the reader, if the user presses the "EXIT" key 25, thereby releasing the code display ("YES" in STEP S42), the CPU 11 returns to the display state of STEP S22 for a normal operation.

Subsequently, a case where a plurality of contrast values Cc for code display is individually stored in individual storage areas 161 of the storage unit 16 will be described.

In a case of reading the two-dimensional code by the reader, if it is impossible to successfully read the two-dimensional code, the user operates the cursor key 21 for moving the cursor up or down in STEP S43, thereby changing the display contrast in STEP S44. In this state, in a case of registering a newly set contrast, the user operates the "AC" key 23 (which works as a setting key). If the operation on the "AC" key 23 is detected ("YES" in STEP S52), in STEP S53, the CPU 11 stores the contrast value Cc for code display retained in the register at that moment, as a new contrast value Cc for code display, in an empty storage area of the storage unit 16.

For example, in a case where different users perform reading by different types of readers, the CPU 11 performs the processes of STEPS S41 to S44, S52, and S53, whereby changed contrast values Cc for code display are additionally stored in individual storage areas 161n of the storage unit 16.

As described above, according to the electronic device (that is, for example, the scientific calculator 1) related to the present embodiment, it is possible to individually a contrast value Cc for code display for displaying a two-dimensional code or the like with such a contrast that even in a case where a reader is replaced with another reader, the two-dimensional code or the like can be read by the replaced reader. Therefore, even if a reader is replaced with another reader, it is possible to select a contrast value Cc for code display appropriate for the replaced reader, thereby capable of smoothly and precisely performing a reading operation using the replaced reader.

Although the embodiments of the present invention have been described above, the scope of the present invention is not limited to the above described embodiments and the like, and includes the scopes of the inventions described in claims and the scopes of their equivalents.

What is claimed is:

1. An electronic device comprising:
    a display;
    a memory that stores instructions; and
    a processor that, under control of the instructions, performs processes comprising:
        a first display process of controlling the display such that the display displays a code while setting the display with a contrast ratio as a starting contrast ratio; and
        in a case where the code is displayed on the display, a contrast control process of maintaining the contrast ratio of the display at the starting contrast ratio for a first duration of time and then automatically changing the contrast ratio of the display at each of intervals, each of the intervals corresponding to a second duration of time,
    wherein the contrast control process comprises a first contrast change process of automatically changing the contrast ratio of the display in a stepwise manner from the starting contrast ratio to an upper limit contrast ratio thereby increasing the contrast ratio of the display at each step after maintaining the contrast ratio of the display at the starting contrast ratio for the first duration of time, the upper contrast ratio being greater than the starting contrast ratio.

2. The electronic device according to claim 1, wherein the contrast control process comprises maintaining the contrast ratio of the display during each of the intervals for the second duration of time.

3. The electronic device according to claim 1, wherein:
    the contrast control process further comprises a second contrast change process of automatically changing the contrast ratio of the display in a stepwise manner to a lower limit contrast ratio thereby decreasing the contrast ratio of the display, the lower limit contrast ratio being less than the starting contrast ratio, and
    wherein the second contrast change process further comprises automatically changing the contrast ratio of the display in such manner that (i) the contrast ratio of the display changes in a stepwise manner from the upper limit contrast ratio to the lower limit contrast ratio or (ii) the contrast ratio of the display automatically changes from the upper limit contrast ratio to the starting contrast ratio immediately after the contrast ratio reaches the upper limit contrast and further automatically changes in a stepwise manner from the starting contrast ratio to the lower limit contrast ratio.

4. The electronic device according to claim 1, wherein the code includes a two-dimensional code.

5. A code display method of an electronic device having a display, a memory that stores instructions, and a processor that, under control of the instructions, performs processes comprising:
    a first display step of controlling the display such that the display displays a code while setting the display with a contrast ratio as a starting contrast ratio; and
    in a case where the code is displayed on the display, a contrast control step of maintaining the contrast ratio of the display at the starting contrast ratio for a first duration of time and then automatically changing the contrast ratio of the display at each of intervals, each of the intervals corresponding to a second duration of time,
    wherein the contrast control step comprises a first contrast change step of automatically changing the contrast ratio of the display in a stepwise manner from the starting contrast ratio to an upper limit contrast ratio thereby increasing the contrast ratio of the display at each step after maintaining the contrast ratio of the display at the starting contrast ratio for the first duration of time, the upper contrast ratio being greater than the starting contrast ratio.

6. The code display method according to claim 5, wherein the contrast control step comprises maintaining the contrast ratio of the display during each of the intervals for the second duration of time.

7. The code display method according to claim 5, wherein:
    the contrast control step further comprises a second contrast change step of automatically changing the contrast ratio of the display in a stepwise manner to a lower limit contrast ratio thereby decreasing the contrast ratio of the display, the lower limit contrast ratio being less than the starting contrast ratio, and
    wherein the second contrast change step further comprises automatically changing the contrast ratio of the display in such manner that (i) the contrast ratio of the display changes in a stepwise manner from the upper limit contrast ratio to the lower limit contrast ratio or (ii) the contrast ratio of the display automatically changes from the upper limit contrast ratio to the starting contrast ratio immediately after the contrast ratio reaches the upper limit contrast and further automatically changes in a stepwise manner from the starting contrast ratio to the lower limit contrast ratio.

8. The code display method according to claim 5, wherein the code includes a two-dimensional code.

9. A non-transitory recording medium having a program stored thereon which controls an electronic device which includes a display, a memory that stores instructions, and a processor that, under control of the instructions, performs processes comprising:

a first display process of controlling the display such that the display displays a code while setting the display with a contrast ratio as a starting contrast ratio; and in a case where the code is displayed on the display, a contrast control process of maintaining the contrast ratio of the display at the starting contrast ratio for a first duration of time and then automatically changing the contrast ratio of the display at each of intervals, each of the intervals corresponding to a second duration of time, wherein the contrast control process comprises a first contrast change process of automatically changing the contrast ratio of the display in a stepwise manner from the starting contrast ratio to an upper limit contrast ratio thereby increasing the contrast ratio of the display at each step after maintaining the contrast ratio of the display at the starting contrast ratio for the first duration of time, the upper contrast ratio being greater than the starting contrast ratio.

10. The non-transitory recording medium according to claim 9, wherein the contrast control process comprises maintaining the contrast ratio of the display during each of the intervals for the second duration of time.

11. The non-transitory recording medium according to claim 9, wherein:

the contrast control process further comprises a second contrast change process of automatically changing the contrast ratio of the display in a stepwise manner to a lower limit contrast ratio thereby decreasing the contrast ratio of the display, the lower limit contrast ratio being less than the starting contrast ratio, and wherein the second contrast change process further comprises automatically changing the contrast ratio of the display in such manner that (i) the contrast ratio of the display changes in a stepwise manner from the upper limit contrast ratio to the lower limit contrast ratio or (ii) the contrast ratio of the display automatically changes from the upper limit contrast ratio to the starting contrast ratio immediately after the contrast ratio reaches the upper limit contrast and further automatically changes in a stepwise manner from the starting contrast ratio to the lower limit contrast ratio.

12. The recording medium according to claim 9, wherein the code includes a two-dimensional code.

* * * * *